United States Patent Office 3,105,019
Patented Sept. 24, 1963

3,105,019
RECOVERY OF PIPERAZINE
James V. Murray, Jr., South Charleston, and David W. Peck, Charleston, W. Va., assignors to Union Carbide Corporation, a corporation of New York
No Drawing. Filed Nov. 4, 1958, Ser. No. 771,747
7 Claims. (Cl. 202—42)

The present invention relates to the separation of organic compounds, and more particularly, to an improved process for recovering piperazine from a mixture with triethylenediamine.

In the production of piperazine, as for example, by the reaction of other amines such as by the intramolecular reaction of diethylenetriamine or aminoethyl ethanolamine, or by the intermolecular reaction of ethylenediamine, substantial quantities of triethylenediamine are generally formed as a by-product. The utilization of subsequent separation techniques capable of isolating piperazine from a mixture with triethylenediamine is therefore necessary if a piperazine product of high purity is to be obtained.

A commonly employed procedure for effecting such a separation lies in the conventional fractional distillation of the piperazine-triethylenediamine mixture. Unfortunately, however, although approximately a 25-degree difference exists between the boiling points of piperazine (boiling point 148° C.) and triethylenediamine (boiling point 173° C.), the conventional distillation of the piperazine-triethylenediamine mixture is, nevertheless, ordinarily attended by the recovery of a piperazine product contaminated by appreciable quantities of triethylenediamine. This is particularly true of the piperazine product collected near the end of the distillation, the product often being contaminated by as much as 25 percent or more by weight of triethylenediamine.

Various other techniques have also been suggested for separating secondary bases from tertiary bases, in general. For instance, a mixture containing both a secondary and tertiary amine can be treated with benzoyl chloride, which compound reacts with the secondary amine to form the corresponding benzamide but does not react with the tertiary amine. The tertiary amine can then be separated from the mixture by various means such as distillation, extraction with water or aqueous mineral acid, etc., depending upon the physical and chemical properties of the tertiary amine and the benzamide. Upon removal of the tertiary amine as hereinabove described, the secondary amine can be recovered by hydrolysis of the benzamide, followed by the separation of the secondary amine from the resulting hydrolysis reaction product in any convenient manner. Disadvantageously, however, these processes for isolating secondary bases from mixtures with tertiary bases entail the utilization of chemical reactions and inherently, the extensive use of chemical reactants required thereby. Moreover, such processes frequently involve a considerable number of procedural steps. The separation of the secondary bases from tertiary bases is thus rendered an inconvenient, time-consuming and uneconomical operation.

These difficulties can now be overcome through the practice of the present invention, an object of which is to provide an improved process for the substantial recovery of piperazine from a mixture with triethylenediamine as a product of high concentration. Another object of the invention is to provide an improved process for the recovery of piperazine from a mixture with triethylenediamine which process is not closely dependent upon the initial concentration of the various components of the mixture. Still other objects and advantages of the invention will become apparent in light of the following description.

In its broadest aspect, the invention contemplates subjecting a piperazine-triethylenediamine mixture to azeotropic distillation in the presence of a hydrocarbon or mixture of hydrocarbons having a boiling point within the range of from about 110° C. to about 200° C. so as to obtain a distillate comprised essentially of a minimum-boiling piperazine-hydrocarbon azeotrope. The piperazine component can then be recovered from the azeotropic distillate with facility in several different ways as hereinafter described. In this manner, it is possible to recover up to 90 percent or more by weight of piperazine from a mixture with triethylenediamine as a product contaminated by as little as one percent or less of triethylenediamine.

It is to be noted that while especial advantage has been found to accrue through the practice of the invention in association with the production of piperazine by the reaction of an amine such as ethylenediamine, diethylenetriamine or aminoethylethanolamine, the process of the invention is not necessarily limited thereto and can be employed to recover piperazine from any piperazine-triethylenediamine mixture regardless of the means by which the mixture was produced.

In an embodiment of the invention the piperazine-triethylenediamine mixture is suitably admixed with the hydrocarbon or hydrocarbon mixture of appropriate boiling point, and the resulting mixture introduced into a distillation zone. Typical of the hydrocarbons which can be employed as azeotroping agent there may be mentioned the following, although others can also be used: alkanes, including cycloalkanes, such as octane, nonane, decane, undecane, dimethylcyclohexane, cycloheptane and the like; alkenes, including cycloalkenes, such as octene, nonene, decene, undecene, methylcyclohexene and the like; alkynes such as octyne, nonyne, decyne and the like; aliphatic-substituted benzenes, such as toluene, ethylbenzene, propylbenzene, butylbenzene, xylene, mesitylene styrene and the like, etc.

Of the suitable hydrocarbons, the use of an aliphatic hydrocarbon and especially a saturated aliphatic hydrocarbon is preferred. In addition, while piperazine has been found to azeotrope with a wide variety of hydrocarbons having boiling points within the range of from about 110° C. to about 200° C., particularly good results can be obtained in accordance with the invention utilizing a hydrocarbon or hydrocarbon mixture having a boiling point within the range of from about 140° C. to about 160° C.

Both the boiling point and the piperazine content of the azeotrope has been found to vary with the composition and boiling point of the hydrocarbon azeotroping agent. This can be seen more clearly from the following table, Table A, in which the data obtained from azeotropic distillations of piperazine-triethylenediamine mixtures in the presence of various hydrocarbon fractions are tabulated.

TABLE A

| Hydrocarbon | | Azeotrope | |
|---|---|---|---|
| Fraction | Boiling Range, ° C. | Boiling Range, ° C. | Piperazine Content, Percent |
| 3-Methylheptane | 119–122 | 117–118 | 11 |
| 2-Ethylhexene | [1] 121.5 | 120–121 | 9 |
| 1,2-Dimethylcyclo-hexane | 125–129 | 123–125 | 18 |
| meta-xylene | 139 | 137 | 15 |
| Nonane | 139–146 | 133–136 | 37 |
| Styrene | 145 | 143 | 22 |
| Nonane | 144–150 | 134–136 | 43 |
| Nonane | 150–153 | 137–133 | 46 |
| Nonane | 157–159 | 141–142 | 54 |
| Mesitylene | 165 | 147–148 | 70 |
| Kerosene | 170–175 | 143–144 | 68 |
| Kerosene | 180–185 | 143–146 | 77 |
| None | | 148 | 100 |

[1] Micro-boiling point.

From the above table it can be seen that a saturated hydrocarbon fraction having a boiling point approximately the same as that of piperazine, viz., a nonane fraction having a boiling point within the range of from about 144° C. to about 150° C., will form an azeotrope with piperazine containing about 43 percent by weight of piperazine and boiling at a temperature approximately 10 degrees below that of the components of the azeotrope, viz., in the range of from about 134° C. to about 136° C. As the boiling point of the hydrocarbon azeotroping agent decreases below the boiling point of piperazine, a corresponding decrease in both the boiling point and piperazine content of the piperazine azeotrope formed therewith can generally be observed. At the same time, it can be seen that, at the lower boiling points described, an unsaturated aliphatic hydrocarbon will form an azeotrope with piperazine containing only a slightly lower piperazine content than that formed by a saturated aliphatic hydrocarbon having approximately the same boiling point, while an aromatic hydrocarbon will form an azeotrope with piperazine containing a considerably lower piperazine content than that formed by either a saturated or unsaturated aliphatic hydrocarbon having approximately the same boiling point. As hydrocarbons of diminishing boiling points are employed as azeotroping agents, a hydrocarbon having a boiling point so low that it does not form an azeotrope with piperazine containing a piperazine content sufficient to warrant commercial application of the process is ultimately reached. Such hydrocarbons have been found to have a boiling point of less than about 110° C.

On the other hand, as the boiling point of the hydrocarbon azeotroping agent increases above the boiling point of piperazine, a corresponding increase in both the boiling point and piperazine content of the piperazine azeotrope formed therewith has generally been found to occur. It can also be seen from the above table that, at the higher boiling points described, an aromatic hydrocarbon will form an azeotrope with piperazine containing a higher piperazine content than that formed by either a saturated or unsaturated aliphatic hydrocarbon having approximately the same boiling point. As hydrocarbons of increasing boiling points are utilized as azeotroping agents, a hydrocarbon having a boiling so high that it does not form a minimum boiling azeotrope with piperazine is ultimately reached. Such hydrocarbons have been found to have a boiling point of more than about 200° C.

Hydrocarbons having boiling points substantially above the boiling point of piperazine have in certain instances also been found to form minimum-boiling azeotropes with triethylenediamine. Such azeotropes, however, generally have boiling points well above the corresponding piperazine-hydrocarbon azeotrope and do not interfere with the recovery of piperazine in accordance with the process of the invention. For example, even when higher boiling hydrocarbon fractions are employed as azeotroping agent, more than 90 percent by weight of the piperazine content of the piperazine-triethylenediamine mixture can be recovered, contaminated by less than one percent by weight of triethylenediamine.

The amount of hydrocarbon to be employed as azeotroping agent is not narrowly critical to the invention. Sufficient hydrocarbon to azeotrope with all of the piperazine present in the piperazine-triethylenediamine mixture should be used, however, if the high yields of piperazine are to be recovered. Generally, the composition, molecular weight and boiling point of the hydrocarbon utilized as azeotroping agent, the concentration of piperazine in the piperazine-triethylenediamine mixture and the ratio of piperazine to hydrocarbon in the resulting azeotrope are all determinative of the amount of hydrocarbon required to insure the substantially complete recovery of piperazine. This amount can readily be determined by one skilled in the art. In this connection, particularly good results can be realized using from about one to about 20 parts by weight of hydrocarbon per part of piperazine contained in the piperazine-triethylenediamine mixture, although higher or lower proportions of hydrocarbon may also be utilized in the invention with satisfaction. In addition to the hydrocarbon azeotroping agent, a "chaser," such as a high boiling hydrocarbon, e.g., 1-methylnaphthalene, and the like, can also be added to the piperazine-triethylenediamine mixture in order to facilitate the distillation of the piperazine-hydrocarbon azeotrope.

The azeotropic distillation is preferably carried out at atmospheric pressure, although distillation at reduced pressures or at pressures slightly above atmospheric pressure can also be performed if desired.

The temperature at which the piperazine-hydrocarbon azeotrope distills over is dependent upon both the composition and boiling point of the hydrocarbon as well as to the pressure at which distillation is conducted, and can readily be determined by one skilled in the art. Such a relationship can be seen above from Table A for distillations conducted at atmospheric pressure.

In a typical azeotropic distillation, heat is increasingly applied to the piperazine-triethylenediamine-hydrocarbon mixture in the distillation zone at the desired pressure until a temperature is reached at which the piperazine-hydrocarbon distills over. The distillation is continued at this temperature level until further quantities of the piperazine-hydrocarbon azeotrope can no longer be recovered or until the temperature of the reflux rises substantially above the boiling point of the azeotrope. The piperazine component can then be separated and recovered from the azeotropic distillate in any suitable manner.

By way of illustration, upon cooling the distillate to a temperature of about 50° C. or lower, the piperazine component of the azetrope will crystallize out and can thereafter be filtered by any convenient means. The hydrocarbon adhering to the piperazine crystals can be washed off with a suitable solvent such as hexane, pentane and the like, or removed by recrystallization of the piperazine from similar solvents.

If, instead, aqueous piperazine is desired as a product, the azeotropic distillate can be contacted and admixed with water. The distribution coefficient of piperazine between water and a hydrocarbon is considerably in favor of the water, so that in a single contact substantially all of the piperazine will transfer to the aqueous phase, although more than one such contact may be employed. The aqueous piperazine-rich layer can then be separated from the hydrocarbon-rich layer by decantation or as otherwise deemed expedient.

If desired, the hydrocarbon component of the azeotrope can be recycled to the distillation zone where it is admixed with further quantities of the piperazine-triethylenediamine mixture. The recycling of the hydrocarbon in such a manner provides a continuous method for the recovery of piperazine wherein a considerable savings in the amount of azeotroping agent is possible. However, the process of the invention can also be carried out efficiently in batchwise operation.

The process of the invention can also be illustrated by description in connection with the following specific examples of its practice, although not necessarily limited thereto.

Example 1

A mixture containing 84 grams of piperazine and 21 grams of triethylenediamine was charged to the kettle of a 16-inch long by 1-inch diameter still column packed with protruded stainless steel saddles. To this mixture, 350 milliliters of a nonane fraction having a boiling range of from 144° C. to 150° C. was added. Heat was applied to the still, and the resulting piperazine-triethylenediamine nonane mixture subjected to azeotropic distillation at atmospheric pressure and at a 9:1 reflux ratio. At a temperature of between 134° C. to 136° C., 195 grams of an azeotropic distillate was collected and determined by potentiometric titration and infrared spectometry to contain 83 grams (43 percent by weight) of piperazine and no detectable proportion of triethylenediamine. Twenty-one grams of the azeotropic distillate were then admixed with 6 grams of water and allowed to equilibrate at a temperature of 45° C. The resulting aqueous and hydrocarbon layers were separated by decantation and subjected to potentiometric titration whereby it was determined that the aqueous layer contained 53 percent by weight of piperazine and the hydrocarbon layer 0.6 percent by weight of piperazine.

*Example 2*

In a manner and using equipment similar to that described in Example 1, a mixture containing 25 grams each of piperazine and triethylenediamine and 350 milliliters of 3-methylheptane boiling in the range of from 119° C. to 122° C. was subjected to azeotropic distillation. At a temperature of between 117° C. and 118° C., an azeotropic distillate was collected and determined by potentiometric titration to contain 23 grams (11 percent by weight) or piperazine and no detectable proportion of triethylenediamine.

*Example 3*

In a manner and using equipment similar to that described in Example 1, a mixture containing 10 grams each of piperazine and triethylenediamine and 150 milliliters of 2-ethylhexene having a micro-boiling point of 121.5° C. was subjected to azeotropic distillation. At a temperature of between 120° C. and 121° C., 82 grams of an azeotropic distillate were collected and determined by potentiometric titration to contain 7.4 grams (9 percent by weight) of piperazine. An 80 gram portion of the azeotropic distillate was cooled to a temperature of 25° C. so as to crystallize the piperazine component. The hydrocarbon mother liquor was decanted and 60 milliliters of the hydrocarbon returned to the still kettle. The distillation was then continued and additional azeotropic distillate collected as a fraction boiling within the same temperature range. In this manner, a total of 9.4 grams of piperazine was recovered as an azeotropic distillate in the absence of any detectable proportion of triethylenediamine.

*Example 4*

In a manner and using equipment similar to that described in Example 1, a mixture containing 80 grams of piperazine, 20 grams triethylenediamine and 700 milliliters of 1,2-dimethylcyclohexane boiling in the range of from 125° C. to 129° C. was subjected to azeotropic distillation. At a temperature of between 123° C. and 125° C., 463 grams of an azeotropic distillate were collected and determined by potentiometric titration to contain 78 grams (17 percent by weight) of piperazine and no detectable proportion of triethylenediamine. A 73.5 gram portion of the azeotropic distillate was cooled to a temperature of 25° C. so as to crystallize the piperazine component and the hydrocarbon mother decanted. The piperazine crystals were then washed with hexane and dried at a temperature of 25° C. under reduced pressure. In this manner, 12 grams of refined anhydrous piperazine was obtained. Another, 75 gram portion of the azeotropic distillate was admixed with 30 grams of water and allowed to equilibrate for 4 hours at a temperature of 50° C. The resulting 44 gram aqueous layer and 60 gram hydrocarbon layer were separated by decantation and subjected to potentiometric titration whereby it was determined that the aqueous layer contained 13 grams (30 percent by weight) of piperazine and the hydrocarbon layer 0.04 gram (0.1 percent by weight) of piperazine.

*Example 5*

In a manner and using equipment similar to that described in Example 1, a mixture containing 30 grams of piperazine, 10 grams of triethylenediamine and 350 milliliters of meta-xylene having a boiling point of 139° C. was subjected to azeotropic distillation. At a temperature of 137° C., an azeotropic distillate was collected and determined by potentiometric titration to contain 29 grams (15 percent by weight) of piperazine and no detectable proportion of triethylenediamine.

*Example 6*

In a manner and using equipment similar to that described in Example 1, a mixture containing 40 grams of piperazine, 10 grams of triethylenediamine and 350 milliliters of styrene having a boiling point of 145° C. was subjected to azeotropic distillation. At a temperature of 143° C., an azeotropic distillate was collected and determined by potentiometric titration to contain 34 grams (22 percent by weight) of piperazine and no detectable proportion of triethylenediamine.

*Example 7*

In a manner and using equipment similar to that described in Example 1, a mixture containing 30 grams of piperazine, 10 grams of triethylenediamine, 125 milliliters of mesitylene having a boiling ponit of 165° C. and 100 milliliters of 1-methylnaphthalene having a boiling point of 245° C. was subjected to azeotropic distillation. At a temperature of between 147° C. and 148° C., 32 grams of an azeotropic distillate were collected and determined by potentiometric titration to contain 22 grams (70 percent by weight) of piperazine. The distillation was then continued. On a hydrocarbon-free basis, the first 22 grams of piperazine collected as the azeotropic distillate contained less than 0.1 percent by weight of triethylenediamine, the first 27 grams of piperazine contained less than 0.5 percent by weight of triethylenediamine, while less than 1.0 percent by weight of triethylenediamine was present when 29 grams of piperazine had been collected.

*Example 8*

In a manner and using equipment similar to that described in Example 1, a mixture containing 100 grams of piperazine, 25 grams of triethylenediamine and 300 milliliters of a kerosene fraction boiling in the range of from 180° C. to 185° C. was subjected to azeotropic distillation. At a temperature of between 145° C. and 147° C., 105 grams of an azeotropic distillate were collected and determined by potentiometric titration to contain 81 grams (77 percent by weight) of piperazine. The distillation was then continued. On a hydrocarbon-free basis, the first 81 grams of piperazine collected as the azeotropic distillate contained less than 0.1 percent by weight by triethylenediamine, the first 90 grams of piperazine contained less than 0.2 percent by weight of triethylenediamine, while less than 1.0 percent by weight of triethylenediamine was present when 95 grams of piperazine had been collected. A 58.5 gram portion of the azeotropic distillate collected during the early part of the distillation and containing 45 grams of piperazine was dissolved in one liter of boiling hexane. The solution was allowed to cool to room temperature whereupon piperazine crystals formed and were covered by filtration. In this manner, 43 grams of piperazine containing no detectable proportion of triethylenediamine was obtained.

The present invention is capable of modification within the scope of the appended claims.

What is claimed is:
1. A process for the recovery of piperazine from a mixture with triethylenediamine which comprises subjecting said mixture to azeotropic distillation in the presence of at least one hydrocarbon having a boiling point within the range of from about 110° C. to about 200° C. so as to obtain a distillate comprised essentially of a piperazine-hydrocarbon azeotrope and separating the piperazine component from said distillate.

2. A process for the recovery of piperazine from a mixture with triethylenediamine which comprises subjecting said mixture to azeotropic distillation in the presence of at least one saturated aliphatic hydrocarbon having a boiling point within the range of from about 110° C. to about 200° C. so as to obtain a distillate comprised essentially of a piperazine-hydrocarbon azeotrope and separating the piperazine component from said distillate.

3. A process for the recovery of piperazine from a mixture with triethylenediamine which comprises subjecting said mixture to azeotropic distillation in the presence of nonane so as to obtain a distillate comprised essentially of a piperazine-nonane azeotrope and separating the piperazine component from said distillate.

4. A process for the recovery of piperazine from a mixture with triethylenediamine which comprises subjecting said mixture to azeotropic distillation in the presence of styrene so as to obtain a distillate comprised essentially of a piperazine-styrene azeotrope and separating the piperazine component from said distillate.

5. A process for the recovery of piperazine from a mixture with triethylenediamine which comprises subjecting said mixture to azeotropic distillation in the presence of mesitylene so as to obtain a distillate comprised essentially of a piperazine-mesitylene azeotrope and separating the piperazine component from said distillate.

6. A process for the recovery of piperazine from a mixture with triethylenediamine which comprises subjecting said mixture to azeotropic distillation in the presence of a kerosene fraction having a boiling point up to about 200° C. so as to obtain a distillate comprised essentially of a piperazine-kerosene azeotrope and separating the piperazine component from said distillate.

7. A process for the separation of a mixture wherein piperazine and 1,4-diazabicyclo-(2.2.2)-octane are present to a substantial extent which comprises adding a hydrocarbon having a boiling range of 135–180° C. to the mixture distilling said mixture so that piperazine and the additive hydrocarbon are separated as a distillate, relatively free of 1,4-diazabicyclo-(2.2.2)-octane and the 1,4-diazabicyclo-(2.2.2)-octane remains as a distilland, relatively free of piperazine.

References Cited in the file of this patent

UNITED STATES PATENTS 2,813,869     Langdon _____ Nov. 19, 1957